INVENTORS
DAVID T. PUTNAM
WILLIAM C. TATUM
BY
ATTORNEY

United States Patent Office 3,647,582
Patented Mar. 7, 1972

3,647,582
METHOD FOR LOCATING PRINTED CIRCUIT WORK PIECE
David T. Putnam, Raleigh, and William C. Tatum, Durham, N.C., assignors to International Business Machines Corporation, Armonk, N.Y.
Filed June 30, 1969, Ser. No. 837,565
Int. Cl. H05k 1/00, 3/00
U.S. Cl. 156—3                                     3 Claims

ABSTRACT OF THE DISCLOSURE

A method for precision location of an etched pattern on a metal-clad plastic laminate for use with a machine tool for punching, blanking, etc. by etching in the pattern, raised metallic surfaces, and positioning these metallic reference surfaces in fixtures forming a part of an instrumentality such as a machine tool.

BACKGROUND OF THE INVENTION

Field of the invention

The invention relates to a method for the registration of a composite sheet for punching and blanking of single parts.

Description of the prior art

A patent to Armstrong, 918,813, shows a mechanism for cutting wrappers of predetermined length by including on the continuous wrapper strip electrically conductive material which is sensed to operate a cutting device.

The patent to King, 2,002,374, shows a system in which material to be cut is controlled by marking the material at suitable intervals and detecting the marks photoelectrically.

A patent to West, 2,021,038, shows an apparatus for the cutting of tape or labels between the printed portions thereof in which holes are formed in the continuous tape when the same is printed and these holes are sensed to control the advancing mechanism.

A patent to Pechy, 2,047,221, shows an apparatus for detecting imperfections in strip stock, identifying the same by identations and then later cutting the stock in dependence on that marking.

A patent to Huck, 2,266,759, is directed to a printed sheet trimming machine in which registration of the sheets is accomplished by a photoelectric registering mechanism.

The patent to Ferger, 2,369,223, is directed to an automatic work locator in which the work is located by means of small dots made of suitable light reflecting material which are detected by a photoelectric apparatus.

The patent to Mercer et al., 3,185,006, is directed to a method for trimming the side edges of sheets of material so that they are parallel to each other which consists of engaging the leading edge by stops and trimming the side edges at right angles to the leading edge.

SUMMARY OF THE INVENTION

The present invention is concerned with registration of a sheet of metal-clad plastic laminate with respect to a machine tool where the metal clad laminate is etched to form a metallic pattern on the plastic, and it is necessary that the machine operations be performed at some precise point with respect to the metallic pattern. The problem is that the plastic is not dimensionally stable, and there is no means for controlling the machine operations with respect to the part itself. While the prior art discloses methods for locating work pieces by marking or punching holes, the disadvantage of providing an elaborate photoelectric positioning apparatus or the necessity for punching holes at the time of printing are economic disadvantages.

The present method of locating a work piece takes advantage of the etching process which provides raised metallic portions to establish metallic reference points which may be very simply used with mechanical fixtures for precisely locating the pattern in the machine tool.

It is, therefore, an object of the present invention to provide a method for precisely positioning an etched pattern formed from a metal surface.

Figure 1:
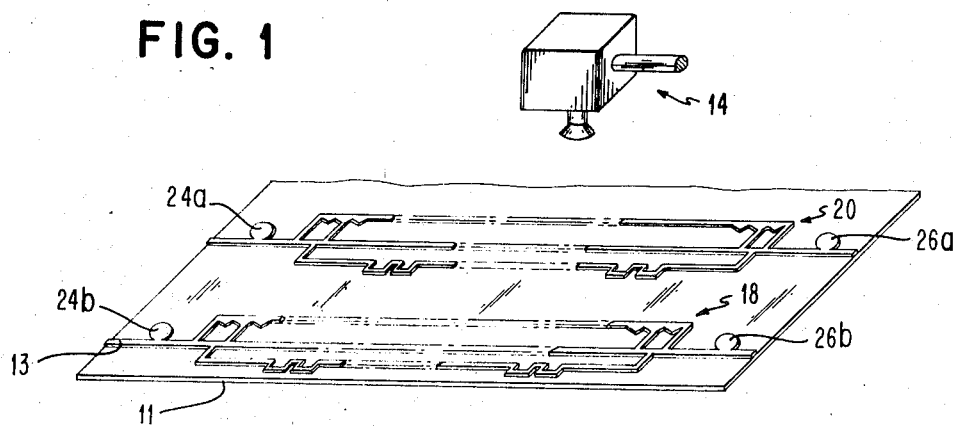
FIG. 1 is a view of a metal clad plastic laminate on which a pattern is exposed.

A copper-coated Mylar sheet 10 is etched to form a metallic pattern as shown in FIG. 1. In the fabrication of the device of the present invention, a substrate 11 made from Mylar, trademark for the film of polyethylene terephthalate, or like material, is coated with a polyester adhesive 12 (FIG. 2) so as to establish an adhesive bond between the Mylar substrate and a film of copper metal 12 secured to the adhesive covered surface of the Mylar substrate. The copper clad laminate is then processed in order to form the desired circuitry pattern on the copper surface by conventional techniques which are hereinafter described by way of illustration only and do not form an essential part of this invention.

The copper surface may be cleaned and prepared for etching by any of the methods which are well known in the art. A photoresist emulsion may then be applied to the copper surface and selected portions of the resist material are exposed to a light source 14 in correspondence with the desired circuitry pattern to be formed on the copper coating. The exposed portions may then be developed and hardened by commonly known methods. The resist emulsion from the undeveloped portions of the copper surface is removed and the remaining surface is rinsed and cleaned. The unwanted copper is then etched to remove the same and the resist emulsion removed from the desired portion. Following this, the surface of the copper is in condition to be plated.

The copper clad laminate, having the copper surface prepared, is next subjected to a gold plating bath in order to produce thereon, by means of electroplating, a film of gold over the prepared surfaces of the copper. See copending application Ser. No. 789,032, filed Dec. 31, 1968, for "Etching and Gold plating of Copper Clad Mylar Laminate."

Figure 2:
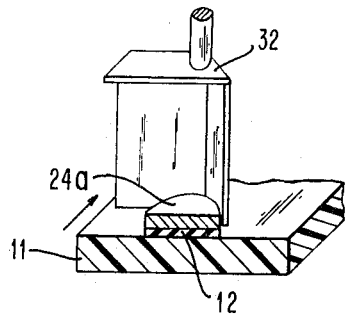
FIG. 2 is a cross-section of a metal clad laminate after etching.

In FIG. 2 is shown a cross-section of the copper-clad Mylar sheet. The copper which has not been etched from the Mylar is approximately, in this particular instance, .0014 inch. The copper is bonded to the Mylar by an adhesive of sufficient strength to prevent dislodging of the copper by routine handling.

During chemical processing the laminate 11 shrinks and/or expands which prevents accurately positioning the laminate in a machine by using the edges of the same. This is particularly so when the laminate contains a number of parts 18, 20, etc., and each part has a requirement for a machine operation of a specific tolerance.

The present method eliminates the problem arising from dimensional variation in the laminate by including on each circuit pattern reference discs 24a, 26a, 24b, 26b, etc. The reference discs are photographically projected by projector 14 onto the photosensitized emuulsion very accurately with respect to required pattern 18 and 20. After etching the disc, e.g. 24a, FIG. 2, has a vertical physical dimension and retains its precise position with respect to required pattern because it has been subjected to the same processing treatment as the pattern.

While in this particular specific example there are two discs 24a and 26a to permit the very flexible material to be positioned from two reference points, it is apparent that a more rigid material as a substrate might only require a single reference point.

Figure 3:
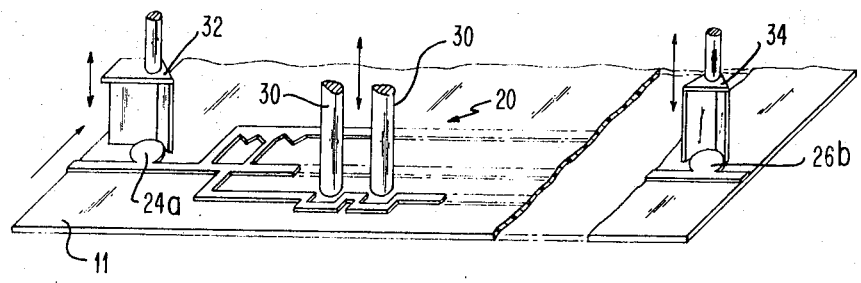
FIG. 3 is an illustration of how the pattern of FIG. 1 is positioned relative to a machine tool.

The machine operation to be performed on the printed circuit part is shown schematically in FIG. 3 as a punching operation. The requirement is that the punches 30 be precisely positioned with respect to the printed circuit 20. In the specific instance it was necessary that the etched pattern be held within ±.003 inch in the x–y plane.

The machine tool shown schematically in FIG. 3 has two fixtures 32 and 34 which are biased toward the Mylar sheet 11 by sufficient force to bring the fixtures into contact with the sheet but not sufficient to prevent movement thereof. The fixtures are precisely fixed with respect to machine tool and punches 30.

The etched pattern is moved into the machine tool and the registration discs 24a, 26a are positioned in fixtures 32 and 34.

By providing reference discs on either side of the metallic pattern, the plastic sheet is permitted to flatten out, eliminating variations because of expansion and shrinking of the plastic sheet in the horizontal plane.

The punches 30 may then be operated to accurately form a hole in the Mylar, a subsequent blanking operation removes the finished printed circuit from the continuous Mylar sheet and the registration discs, if desired.

It is apparent that other geometric registration portions of a printed circuit can be formed to coact with other fixtures to establish precision control.

It is apparent that etching of any metallic surface would permit utilization of this method so long as the reference points are part of a printed circuit pattern.

What is claimed is:

1. A method for locating a metal-clad plastic work piece with respect to an instruumentality physically coacting therewith which comprises coating said work piece with a photoresist, exposing said photoresist to create a pattern containing reference points on opposite sides of said pattern from which said pattern is locatable, developing said photoresist to remove the undesired portion thereof, etching said work piece and positioning said reference points with respect to fixtures located with respect to said instrumentality whereby the physical position of said work piece and instrumentality are precisely determined.

2. A method for locating a metal-clad plastic work piece with respect to a machine tool physically coacting therewith comprising the steps of:

coating said work piece with a photoresist, exposing said photoresist to create a pattern containing two circular reference points at opposite edges of said pattern, developing said photoresist to remove the undesired portion of said metal from said work piece, positioning said circular reference points on said work piece against a pair of fixtures, which guide said work piece into final registration with respect to said machine tool for further processing.

3. The method described in claim 2, wherein said positioning step is accomplished by moving said work piece containing said two circular reference points until said reference points are in registration with a pair of V-shaped fixtures which guide said work piece into final registration with respect to said machine tool for further processing.

References Cited

UNITED STATES PATENTS 2,047,221   7/1936   Pechy _____ 164—49

OTHER REFERENCES

Control for Monitoring Etching, vol. 1.9, No. 10, March 1967, 156–435, P. A. Tatusko, p. 1263.

JACOB H. STEINBERG, Primary Examiner

U.S. Cl. X.R.

156—345